May 16, 1933.  A. J. McMASTER  1,909,115
OPTICAL SYSTEM
Filed Jan. 20, 1930
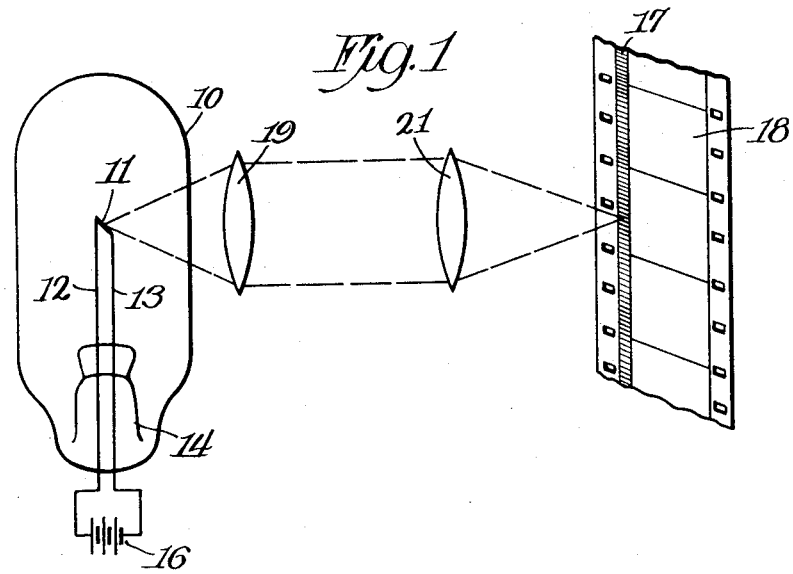
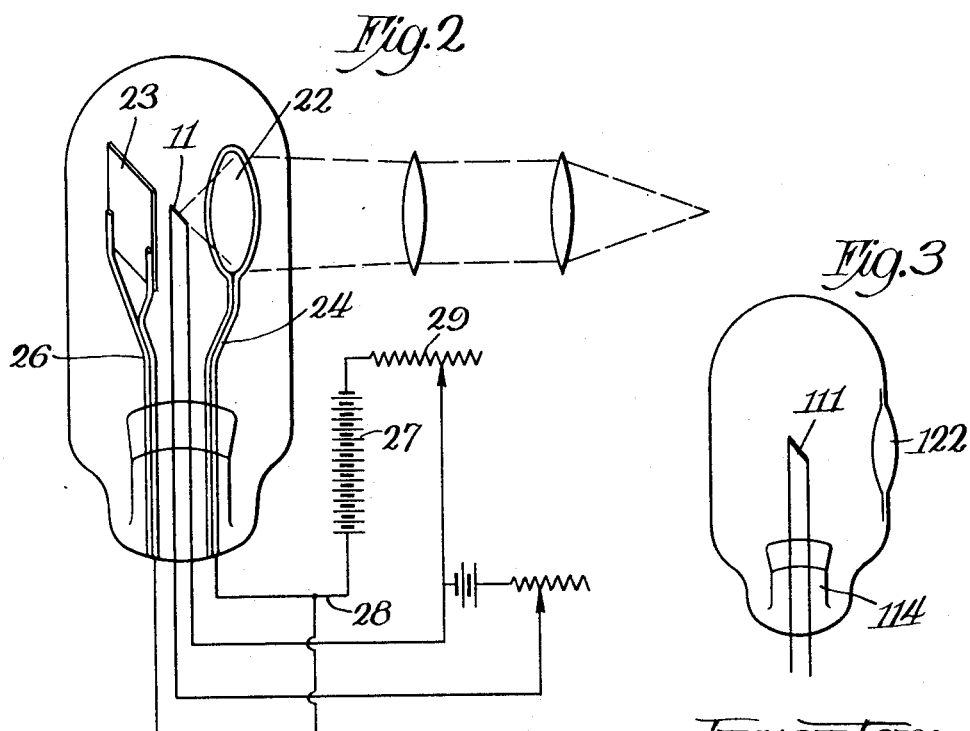
Inventor:
Archie J. McMaster
By George E. Mueller  Atty.

Patented May 16, 1933

1,909,115

UNITED STATES PATENT OFFICE

ARCHIE J. McMASTER, OF CHICAGO, ILLINOIS

OPTICAL SYSTEM

Application filed January 20, 1930. Serial No. 421,922.

My invention relates in general to talking motion pictures, and relates more in particular to an improved lamp for supplying light to the sound strip on the filament, and an improved means for focusing the light on the strip.

Before considering the features of the invention I wish to state that when I refer to talking motion pictures, I mean to include all optical or electro-optical apparatus operating on the same general principle as the sound portion of the moving picture.

It is highly desirable in apparatus of this character to obtain a fine and intense image of light projected on to a plate filament or other object, the reproduction of sound from filaments being the best known system of this type. In this case, two principal methods have been used, namely, what is known as the optical slit and the mechanical slit. In the optical slit the general arrangement is to focus the light from a source on a wedge of optical glass, which by internal reflection produces a fine light line concentrated on the edge of the wedge. In the mechanical slit, a comparatively large source of light is used generally in the form of a horizontal helix, and this is projected through a mechanical slit, the image of the slit being projected on to the sound strip of the filament. There are numerous disadvantages to both of these methods. With the mechanical slit system the light supplied to the slit may have one hundred to two hundred times the width of the slit, and this means that at least 1/100 to 1/200 of the light only is utilized. Furthermore, the slit acts as a new source of light and radiates a new wave front over an angle of 180 degrees. The lens collecting this light have a collecting angle considerably less than this, and so light is again lost.

Besides the loss of power and inefficiency of these systems, chromatic, spherical and other aberrations result requiring a complicated lens system to rectify. The magnitude of the source of light is necessarily limited because in actual practice space is limited. And so, the intensity of the beam actually delivered to the sound strip of the filament, is insufficient to obtain fully satisfactory results. Moreover, I find that due to the character of the primary source of light, the density of the delivered beam is not entirely uniform, and this has certain inherent disadvantages, particularly in a tendency to produce "muddy" sound effects.

The principal object of my present invention is to deliver an intense beam of light of proper size and uniform density to the sound strip.

Another object is the provision of an improved source of light whereby many of the imperfections of the prior art are avoided.

Another object is the provision of a light source requiring only a very simple optical system.

Another object is the provision of a system of this character, wherein a large portion of the produced light is made available for use by the sound strip.

Another object is the provision of a source of light having a long life.

Other objects and features of the invention will be apparent from a consideration of the following detailed description taken with the accompanying drawing, wherein, Fig. 1 shows in its simplest form the improvement of my invention.

Fig. 2 illustrates refinements of the invention with additional features included therein, and, Fig. 3 shows a modification of the lamp employed as a source of light.

In general, my invention comprises utilizing a single horizontal filament, having a diameter substantially equivalent to that of the desired final image. In this way an actual image of the filament is produced, of the same size as the original, and applied directly against the sound strip without the use of either an optical or mechanical slit such as is now employed. By so doing, the image is a solid line of light, whereas in other systems, the final image consists essentially of a section of a helical filament raised by a series of vertical lines such as would be produced by cutting away a horizontal section of the original filament.

Referring now to the drawing, I show an improved type of lamp, having the usual glass envelope, which I have a single line filament 11 disposed horizontally therein. The usual lead wires 12 and 13 serve to support the filament, and extend through the usual base 14, where they are adapted for connection to a suitable source of current 16. This position of the filament assumes that the lamp is mounted upright in the customary way, the film travelling in a vertical plane. The construction of the lamp, however, may be varied in accordance with its intended use, while still maintaining the single line effect. Any suitable lens system is employed, for focusing the image of the filament 11 on to the sound track or sound strip 17, of the usual film 18. I show lenses 19 and 21 which are purely illustrative, and may be changed in accordance with conditions encountered.

To obtain a focused image on the sound strip all that is necessary is that the conjugate foci of the lenses, 19 and 21, correspond. It will produce an image of the same size on the sound strip. However, by means of a suitable lens system, the image may be reduced for application to the sound strip while still maintaining the single line character of the image without the use of a so-called slit. I do not prefer this arrangement in general, however, because I find that some intensity of light is lost by this means.

I wish to state that while a simple lens system is operative, additional lenses may be required to correct chromatic, spherical and other aberrations.

Fig. 2 shows a modifications in the lamp where, in addition to the line filament 11, a lens 22 is mounted directly within the envelope to serve as part of the lens system. At the opposite side of the filament, a plate 23 is mounted, preferably darkened, to prevent reflection from the back of the envelope through the lens, which otherwise would have a tendency to cause interference and distortion of the image. In order to prolong the life of the lamp, I support the lens 22 on a metal support 24, while the plate 23 is constructed of metal and has a metal support 26, both supports 24 and 26 extending through the base of the envelope. By this means I am enabled to create an electrostatic field within the lamp so that all matter emitted by the filament of any character whatsoever, may be deposited on the metal parts and so prevent clouding of the lens or portions of the envelope adjacent the filament.

The drawing illustrates schematically the manner of accomplishing this result. The filament lead is connected to the negative side of a battery 27, while the supports 24 and 26 are connected to the positive side of the battery by a connection 28. The voltage is controlled by a suitable rheostat 29, so that at all times a proper voltage is impressed across the gap between the filament in the center of the plate and lens support at opposite sides.

While I show the lens and plate 23 mounted in the same lamp, it is obvious that it is not necessary to use both of these members together. Instead of employing the metal parts for attracting particles emitted from the filament a separate element for accomplishing this purpose can be employed. The plate 23 can also have various forms, as the entire purpose is to prevent the reflection of light from in back of the filament through the lens system.

In the modification of Fig. 3 I also employ a lens in the envelope, but in place of connecting it by a support within the envelope proper, I employ a lens 122 sealing directly into the wall of the envelope. A line filament 111 is also used in this type of lamp and in addition, any of the other features may be incorporated therewith if desired. The lens system for focusing the image of the filament directly on to the sound strip is used with the lamps shown in Figs. 2 and 3, the same as with the lamp shown in Fig. 1. It is understood however, that some changes in adjustment and the like will have to be made when employing these constructions.

While I have described my invention in detail to enable those skilled in the art to practice the same, I do not restrict myself to the form shown, but the invention is limited only by the scope of the appended claims.

What I claim is new and desire to protect by Letters Patent of the United States is:

1. The combination of a film, a lamp for supplying light to the sound portion of the film for use in talking motion pictures, said lamp including a line filament having a diameter comparable to the final image applied against the film, an anode within the envelope adjacent said filament, and a connection from said anode extending outside the envelope whereby an electrostatic field may be created within the envelope to carry matter emitted by the filament to the anode to prevent darkening of the region of such filament when maintained at a high temperature.

2. The combination of a film, a lamp for supplying light to the sound portion of the film for use in talking motion pictures, said lamp including a line filament having a diameter comparable to the final image applied against the film, lens mounted within the envelope adjacent said filament and adapted to function as part of a lens system for conveying said filament image to the film, an anode also mounted within the envelope and a connection from the anode extending through said envelope whereby an electrostatic field may be created within the envelope to carry matter emitted by the filament to the anode to prevent darkening of said lens when the filament is maintained at a high temperature.

3. The combination of a film, a lamp for supplying light to the sound portion of the film for use in talking motion pictures, said lamp including a line filament having a diameter comparable to the final image applied against the film, a lens in said envelope on one side of said filament, a metal plate with a non-reflecting surface mounted in the filament on the opposite side of said filament, and a connection from the metal plate extending through the envelope, whereby an electrostatic field may be created within the envelope to carry matter emitted by the filament to said metal plate to prevent darkening of said lens and other portions of the lamp adjacent said filament.

4. The combination of a film, a lamp for supplying light to the sound portion of the film for use in talking motion pictures, said lamp including a line filament having a diameter comparable to the final image applied against the film, a lens on one side of said filament, a metal support for said lens extending through said envelope, a metal plate with a non-reflecting surface on the opposite side of the filament, and a connection from said plate extending through said envelope, whereby said metal lens support and metal plate may be connected into a circuit including the filament to create an electrostatic field adjacent the filament to deposit matter emitted from the filament on said metal support and plate.

5. The combination for use in a sound system, of a film, a lamp, a line filament in said lamp, a lens in said lamp, a plate adjacent said filament opposite said lens, said plate having a dark surface for preventing the reflection of light impinging thereon from the filament and means for applying a positive potential to said plate relative to the filament to prevent the deposit of particles given off by the filament upon the lens.

6. The combination for use in a sound system, of a film, means for projecting a line image upon said film comprising a lamp, a line filament in said lamp, a lens in said lamp having a metallic rim, and means for impressing a positive potential on said rim relative to the filament.

In witness whereof I hereunto subscribe my name this 16th day of December, 1929.

ARCHIE J. McMASTER.